United States Patent [19]

Gay et al.

[11] Patent Number: 4,878,572
[45] Date of Patent: Nov. 7, 1989

[54] ROLLER BEARING CAGE FOR CLUTCH RELEASE BEARING

[75] Inventors: Christian Gay, Paris; Philippe Lassiaz, Boulogne, both of France

[73] Assignee: Valeo, Paris, France

[21] Appl. No.: 234,323

[22] Filed: Aug. 19, 1988

[30] Foreign Application Priority Data

Aug. 24, 1987 [FR] France .................. 87 11850

[51] Int. Cl.⁴ .................. F16D 23/14; F16D 25/08
[52] U.S. Cl. .................. 192/98; 192/110 B
[58] Field of Search .............. 192/98, 110 B; 384/612, 384/617

[56] References Cited

U.S. PATENT DOCUMENTS

| | | | |
|---|---|---|---|
| 3,951,244 | 4/1976 | Neder | 192/98 |
| 4,526,258 | 7/1985 | Huber | 192/98 X |
| 4,608,741 | 9/1986 | Mallet | 192/110 B X |
| 4,637,506 | 1/1987 | Billet | 192/110 B |

FOREIGN PATENT DOCUMENTS

| | | | |
|---|---|---|---|
| 0247400 | 12/1987 | European Pat. Off. | 192/98 |
| 2544429 | 10/1984 | France . | |
| 2547002 | 12/1984 | France . | |
| 2584788 | 1/1987 | France . | |

Primary Examiner—Dwight G. Diehl
Assistant Examiner—Nicholas Whitelaw
Attorney, Agent, or Firm—Charles E. Brown; Charles A. Brown

[57] ABSTRACT

A clutch release bearing for an automobile vehicle has an operating member controllable by the clutch release fork and a drive member adapted to act on the fingers of the clutch diaphragm. The drive member comprises a roller bearing having a non-rotatable race formed with a flange for engaging the operating member, a roller cage, and a rotatable race for contact with the diaphragm. The operating member and the drive member are held together by a spring washer which during assembly of the release bearing is engaged and flipped over into position by a fitting bearing which is formed on the roller cage between the rotatable race and the flange.

5 Claims, 2 Drawing Sheets

ROLLER BEARING CAGE FOR CLUTCH RELEASE BEARING

BACKGROUND OF THE INVENTION

1. Field of the Invention

The present invention relates to a clutch release bearing, especially for an automobile vehicle, and more precisely to a particular arrangement of the roller bearing forming part of the drive member of such a clutch release bearing.

As is well known, a clutch release bearing may comprise an operating member adapted to be subjected to the action of a control member such as a clutch release fork, and a drive member adapted to act on the release device of the clutch, which may for example consist of the ends of the fingers of a diaphragm spring.

The drive member usually comprises a roller bearing having rotatable and non-rotatable races between which are disposed the rollers, which are retained in place by a roller bearing cage.

The drive member is held, trough the operation of an elastic washer, either directly or indirectly, in axial bearing contact with the operating member by means of a projection carried thereby.

2. Description of the Related Art

Whatever sort of elastic washer is used, in the operating position one of its peripheries bears against a bearing surface on the operating member and the other of its peripheries bears against a radial flange carried for this purpose by the non-rotatable race.

This washer may be a washer with axial elasticity, for example such as described in French patent application No. 2544429, a bistable elastic washer or, as described in French patent application No. 2584788 a washer with radial elasticity.

The drive member is adapted to act through the intermediary of its rotatable race, either directly or indirectly, on the release device of the clutch.

In practice the elastic washer is installed in the middle of the roller bearing, with a certain radial clearance in the rest configuration, in a generally annular groove delimited by the radial flange connected to the non-rotatable race, the terminal or end face of the rotatable race which is facing towards the radial flange and a deflector, ensuring, in particular, retention of the lubricating grease of the roller bearing.

In order to form the clutch release bearing, the roller bearing thus equipped is engaged on an axial part, for example a sleeve, of the operating member. During the approach of the roller bearing towards the projection of the operating member during fitting, the rotatable race acts as a tool and exerts an axial pushing force, through its end face forming a fitting bearing, on the elastic washer to place the latter into its operating configuration.

This manner of fitting increases the cost of the rotatable race since it is necessary to dimension the race precisely, especially axially, and to machine the end face so that the elastic washer can pass from its rest configuration to its desired operating configuration and can, by pressure, adequately hold the drive member against the operating member.

The object of the present invention is to overcome this disadvantage by making it possible to exert the axial pressure on the elastic washer, for the latter to pass from its rest configuration to its operating configuration, by another, sufficiently strong, part of the roller bearing, whilst providing other advantages.

SUMMARY OF THE INVENTION

According to the invention, a clutch release bearing of the kind described above is characterized in that the fitting bearing is formed on the roller bearing cage, being disposed axially between the radial flange connected to the non-rotatable race and the rotatable race.

It will be understood that since the roller bearing cage is a part which must in any case be sufficiently precisely manufactured to ensure the positioning of the rolling elements, e.g. the balls, the extra cost to form the fitting bearing is insignificant. In addition, the cage, joined to the races of the roller bearing through the rolling elements, forms a strong fitting tool for the elastic washer such that no deterioration of the roller bearing should be feared.

It will be noted that the thickness of the rotatable race does not depend on the elastic washer and that its end face does not need to be machined.

Moreover, the rotatable race ca be shorter so that, in the case of a clutch release bearing not constantly bearing against the release device of the clutch, wear is reduced as a result of the increased inertia of the rotatable race.

It will likewise be understood that the passage of the elastic washer from its rest configuration to its operating configuration is made easier. In fact in the case of a release bearing with an elastic washer with axial elasticity of the bistable kind, for example, the fitting bearing according to the invention is nearer to the periphery of the elastic washer than that of the prior art, so that the effort of fitting is less. In the case of a release bearing with an elastic washer with radial elasticity, the sliding of the washer is facilitated in contact with the larger fitting bearing.

According to another characteristic of the invention, the roller bearing cage comprises a radial projection to form, at least in part, the fitting bearing.

Use is made of the radial projection to form on the edge of the latter an indentation or profile such as a bevel which in the case of a release bearing with a bistable elastic washer facilitates the movement of the washer from its rest configuration to its operating configuration. It will be understood that the indentation enables the bistable elastic washer to come, in the operating configuration, as close as possible to the cage, which makes the roller bearing more compact. In the case of a release bearing with an elastic washer with radial elasticity, advantage is taken of this radial projection to increase the contact surface between the fitting bearing and the elastic washer. This projection may extend beyond the rotatable race towards the axial part of the operating member and may approach even closer to the projecting lip of the operating member so that risk of the washer flipping over during fitting is decreased.

Likewise use is made of the arrangement in accordance with the invention to ensure centering of the elastic washer in the roller bearing by an annular wall integral with the housing of the roller bearing.

Likewise, because of the sitting of the fitting bearing on the roller bearing housing, sealing of the roller bearing may be ensured by having narrow channels, on the one hand, between the radial flange connected to the non-rotatable race and the roller bearing cage and, on the other hand, between the rotatable race and the cage.

This arrangement allows the deflector to be omitted and thus the cost of the clutch release bearing to be reduced even further.

The characteristics and advantages of the invention will emerge from the description which follows, with reference to the attached drawings which are given by way of example only.

DESCRIPTION OF THE PREFERRED EMBODIMENTS

Figure 1:
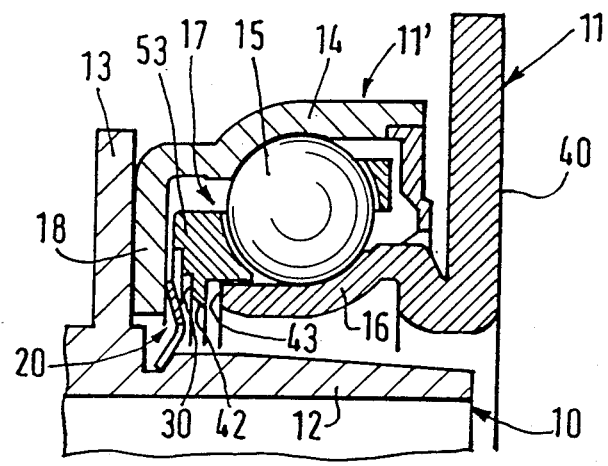
FIG. 1 is a view in axial section of a first embodiment of a release bearing.

According to the embodiments shown in the Figures, a clutch release bearing designed to act on the release device of an automobile clutch, such as the ends of the fingers of a diaphragm (not shown), comprises overall an operating member 10, a drive member 11 and a means of connecting these two members together consisting of an elastic washer 20.

The operating member 10 comprises an axially-extending sleeve 12 slidable movable in the axial direction over a guiding member, as a result of the action of a control element, usually a clutch fork (not shown) adapted to act on a radial projection such as a flange 13 carried for this purpose on the sleeve.

The drive member 11 comprises in the usual manner a roller bearing 11' for example a ball bearing.

In the embodiments in FIGS. 1 to 4, the clutch release bearing is, in known manner a maintained auto-centering clutch release bearing and the ball bearing 11' comprises a non-rotatable outer race 14 and a rotatable inner race 16 between which are disposed the rolling elements 15, in this case balls, held in place by a roller bearing cage 17. The two races 14 and 16 are made economically from pressed sheet metal.

In this embodiment, the non-rotatable race 14 carries a radial flange, in this case a turned over flange 18, directed towards the axis of the assembly, and the rotatable race 16 carries a turned over flange 40 directed radially away from the axis of the assembly.

The flanges 18 and 40 are integral respectively with the race 14 and the race 16 in such a way that the roller bearing 11' and the drive member 11 form one and the same part. The turned over flange 18 is designed to bear, in a manner described hereinafter, on the flange 13 of the operating member 10, whilst the turned over flange 40 forms a driving nose intended to act on the release device of the clutch.

The operating member 10 which, with its flange 13 integral with the sleeve 12, may advantageously be constituted by a moulded part, for examle of reinforced plastic material, comprises on its side at the origin of its flange 13 a shoulder 22 extending in the axial direction for a distance less than the thickness of the sheet metal constituting the race 14, and situated at a diameter less than the internal diameter of the turned over flange 18 of the said race 14 in order to leave a certain predetermined clearance for auto-centering.

This shoulder is followed by a groove 24 in which the elastic washer 20 bears in the operating configuration.

Figure 2:
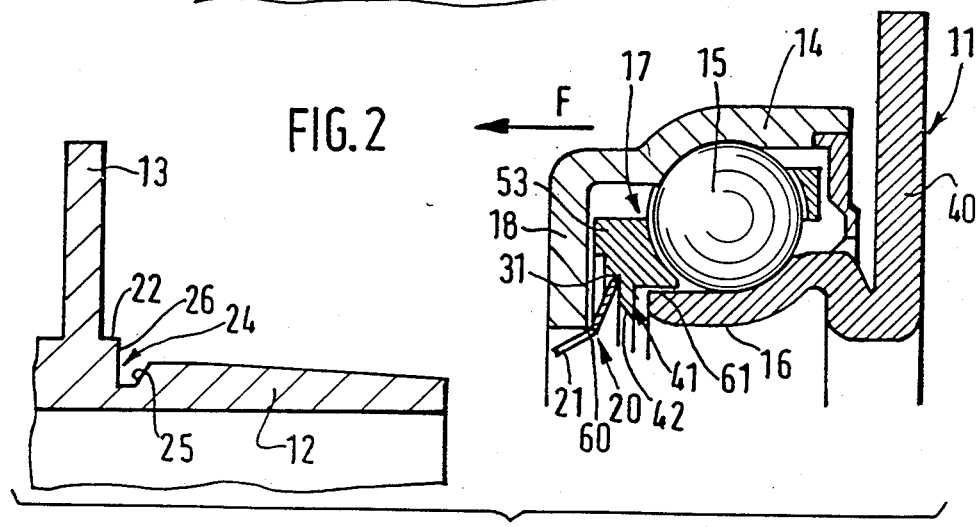
FIGS. 2 and 3 are similar views to FIG. 1 showing two stages of fitting.
Figure 3:
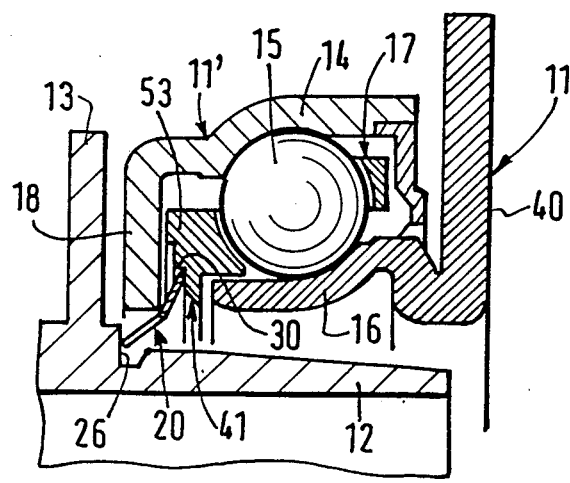

In FIGS. 1 to 3 the elastic washer 20 is a bistable washer, that is to say an elastic washer which is adapted to take up in a stable manner, by reversing, one of two distinct configurations, concave and convex, the one in the resting state and the other when in service. The elastic washer 20, which in this case is of the Belleville washer kind, is designed to bear axially, in the operating configuration, through its outside periphery on the drive member 11 and more precisely on the flange 18 of the non-rotatable race 14; it also comprises along its inside periphery at least one lug 21 designed to bear on an oblique flank or face 25 of the groove 24 in the sleeve 12. This flank 25 thus constitutes a bearing surface for the elastic washer in its operating configuration.

In practice, several lugs 21, regularly spaced circularly, are provided in this way around the internal periphery of the elastic washer 20 and each lug 21, in the same way, forms a dihedron with the elastic washer 20.

In the manner of operation shown, the elastic washer 20 is fitted from the start (FIG. 2) to the drive member 11; this elastic washer 20 is then axially disposed between the flange 18 of the outer race 14 of the ball bearing and the edge 43 of the race 16 facing towards the flange 18.

All these arrangements are disclosed in French patent application No. 8617046, and will not be described in more detail here.

According to the invention the roller bearing cage 17 comprises a fitting bearing 30 which is disposed axially between the flange 18 and the race 16.

In this embodiment the fitting bearing 30 is formed by a shoulder 30 which the cage 17 comprises for this purpose. This shoulder 30 extends radially for a small distance and the internal diameter of this shoulder 30 is greater than the internal diameter of the flange 18 of the outer race 14, whereas the outside diameter of this shoulder 30 is greater than the outside diameter of the end of the race 16 opposite flange 40. Relative to prior art the fitting bearing is thus further away from the neutral position of the Belleville washer 20 which favours its flipping over.

This shoulder 30 is formed at least partially by means of a radial projection 41 integral with the cage 17, the said projection 41 being inserted axially with clearance between the flange 18 and the said end 43 of the race 16. The edge 42 of this radial projection 41 facing towards the axis of the assembly and thus towards the bearing surface 25 is profiled in this embodiment being bevelled.

In FIG. 2 the elastic washer 20 is in the concave, rest configuration and, as shown, it bears on the radial shoulder 30 of the roller bering housing. In this rest configuration it is centered by contact of its outside periphery with an annular axial wall 31 which the roller bearing cage 17 comprises at the base of the radial shoulder 30. Alternatively the washer 20 may be centred on its inside periphery by the flange 60 of the turned-over flange 18.

During fitting, when an axial engagement of the drive member 11 relative to the operating member 10, has been achieved, assisted by the conical shape of the outside surface of the sleeve 12, as shown schematically by the arrow F in FIG. 2, it is through the free ends of the lugs 21 of the elastic washer 20 that the drive member 11 makes axial contact with the operating member 10. In fact the groove 24 comprises a radial flank delimiting the shoulder 22 situated at the origin of the flange 13.

Since the flank 26 extends from a diameter greater than the diameter on which the ends of the lugs 21 are situated when at rest, the latter come into abutment against it before the flange 18 of the race 14 comes into contact with the flange 13 of the operating member (as can be seen in FIG. 3).

When the engagement movement is continued, the shoulder 30 of the cage 17 forms a fitting bearing, and exerts an axial pressure on the outside periphery of the elastic washer 20 whilst, however, its lugs 21 bear against the radial flank 26. In excess of a given force, corresponding to a definite amount of movement, an abrupt complete flip over of the elastic washer 20 occurs from the concave rest configuration (FIG. 2) to convex operating configuration (FIG. 1). In this configuration the washer 20 is at a distance from the shoulder 30 and bears, through its outside periphery, on the flange 18 of the race 14, whilst at its inside periphery its lugs 21 bear on the oblique flank of the groove 24 furthest away from the flange 13.

The washer 20 thus holds the flange 18 in direct axial bearing contact against the flange 13.

As a result of the axial force developed by the elastic washer 20, in combination with a radial clearance J between the shoulder 22 and the edge facing the flange 18, a maintained auto-centering of the ball bearing is provided.

It will be understood that the bevel 42 facilitates movement of the elastic washer from its rest configuration to its operating configuration whilst avoiding any interference between the washer 20 and the projection 41. It will be noted that the bevel 42 reduces the axial distance between the flange 18 and the bearing 30, and thus makes the roller bearing more compact. In giving this indentation a complementary shape to that which the washer 20 adopts in its operating configuration, it is possible to decrease further the axial distinct between the bearing 30 and the flange 18.

Figure 4:
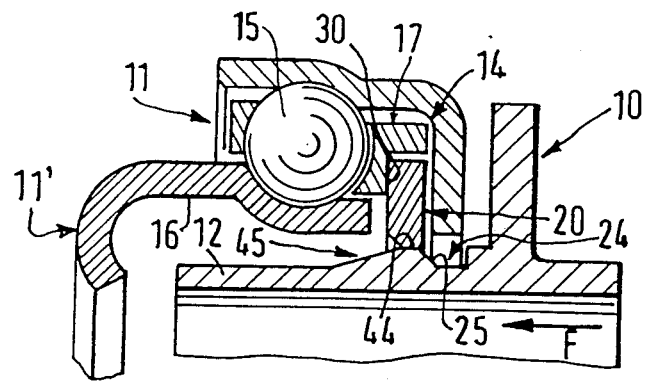
FIG. 4 is a view in axial section of a second embodiment of a release bearing during a stage of fitting.

In the embodiment shown in FIG. 4, the elastic member is not a washer with axial elasticity but a washer with radial elasticity which when bearing through a frustoconical face on the oblique flank 25 of the groove 24, which forms a bearing surface, exerts an axial pressure on the turned over flange 18 of the race 14 as described in French patent application No. 2584788.

It will be seen that in this case too the elastic washer 20 will be pushed axially during fitting by a radially orientated shoulder 30 of the roller bearing cage 17. It will be noted that during the progression of the washer 20 along the ramp 44 of the projecting lip 45 delimiting the oblique flank 25, a sliding contact is produced between the fitting bearing 30 and the washer 20.

It will be understood that the arrangement in accordance with the present invention enables the washer 20 to be simplified so that in this case it can be made without grooves and can have a greater radial extent. It will also be noted that in this embodiment, all of the shoulder 30 is situated radially beyond the outside diameter of the part of the race 16 directed towards the turned over flange 18.

Figure 6:
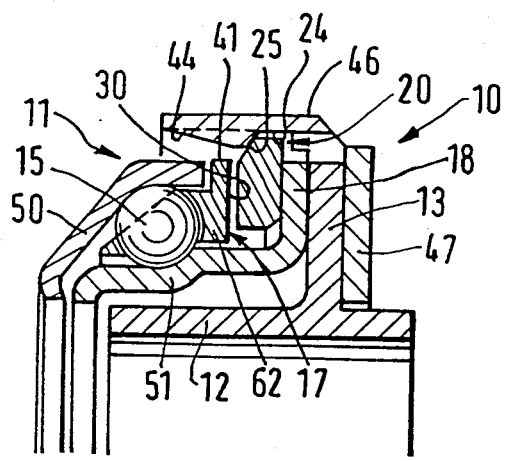
FIG. 6 is a view in axial section of a third embodiment of a release bearing.

In the embodiment shown in FIG. 6, the operating member 10 comprises an axial return 46 at the outside periphery of its flange 13. In this case it is provided with an anti-wear plate 47 on which the control element is designed to operate.

Figure 5:
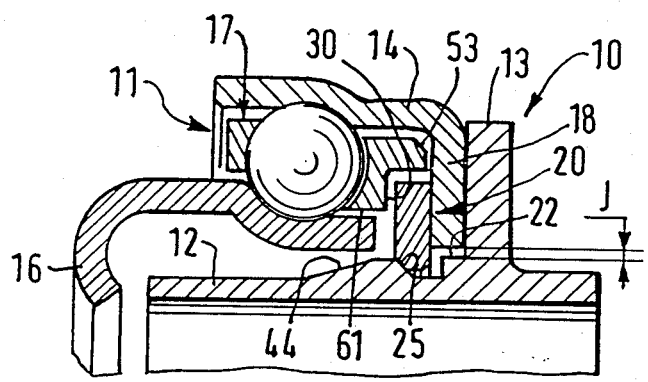
FIG. 5 is a view similar to that in FIG. 4 after the release bearing is assembled.

The drive member 11 is then an outer rotatable race 50 and an inner non-rotatable race 51. The elastic washer with radial elasticity then bears in a groove 24 of the return 46. It will be seen that this elastic washer is pushed axially by a fitting bearing 30 of the roller bearing cage 17. Fitting is effected as in FIGS. 4 and 5 by progression of the washer 20 along the ramp 44.

As in the embodiment of FIGS. 1 to 3, the cage 17 comprises a radial projection 41, in this case directed away from the axis of the assembly.

This radial projection 41, disposed axially between the turned over flange 18 and the outer race 50, enables the surface of the fitting bearing 30 to be increased to extend radially beyond the pivoting race towards the lip 45 of the axial part 46 of the operating member.

Of course, in FIG. 4 it is possible to shorten axially the rotatable race 16 to leave a passage for a radial projection of the cage 17, of the kind in FIG. 6. In this case the projection will extend beyond the rotatable race 16 towards the lip 45, that is to say the inside diameter of this projection will be less than that of the end of the race 16 facing the turned over flange 18.

It will be understood that the cage 17, advantageously made of plastic material, has a minimal coefficient of friction which permits good sliding of the washer 20 in contact with the fitting bearing 30.

It will be noted that in all the embodiments the roller bearing cage has dimensions such that it provides a sealing of the roller bearing by the creation of narrow channels between, on the one hand, the cage 17 and the turned over flange 18 and, on the other hand, the cage 17 and the rotatable race 16. In the embodiments in FIGS. 1 to 5 the narrow channel between the flange 18 and the housing 17 is formed as a result of the radial edge, parallel to the flange 18, of an axially oriented lip 53 on the said housing 17 which is continued radially beyond the fitting bearing 30.

The narrow channel between the cage 17 and the rotatable race 16, radially beyond the latter, is itself formed as a result of the portion 61 of the main part of the cage 17 facing the generally axial end of the race 16. In practice this portion is continuous and extends axially parallel to the end of the race 16.

In FIG. 6 the narrow channels are formed as a result of the continuous portion 62 of the main part of the cage 17, this portion being parallel to the axial portions facing the races 50 and 51.

It will thus be understood that the cage 17 plays the role of deflector whilst offering during the assembling of the release bearing, a counter-bearing for the elastic washer 20 which is much stronger than that which a conventional deflector could offer. Moreover, it will be noted that the projections 41 and the washer 50 prevent the penetration of dirt into the interior of the roller bearing. In the embodiments of FIGS. 4 and 6, a narrow channel exists between the shoulder 30 and the washer 20. Likewise a narrow channel may be created between the rotatable race 16, 50 and the radial projection 41. All these arrangements project the roller bearing.

Thus as emerges from the description and the Figures, the rotatable race 16, 50 may present for its bearing against the clutch release device (not shown), either a driving nose in the form of a turned over flange to bear on a diaphragm, the ends of the fingers of which extend outwardly, or a rounded driving nose (FIGS. 4 to 6) to bear on a diaphragm the ends of the fingers of which are flat.

These alternative driving noses may be carried on the rotatable race 16, 50 as additions, the roller bearing being otherwise conventional.

Similarly it will be noted that, relative to the prior art, the washer 20 may have a greater radial size. In the case of the first embodiment (FIGS. 1 to 3) this is advantageous since the Belleville washer 20 is longer which enables a precise clamping to be obtained despite the manufacturing tolerances. Moreover, the rotatable race is not dependent on the elastic washer either axially or in thickness, and may be shorter.

The present invention is not limited to the embodiments described and shown, but encompasses all alternative embodiments and/or combinations of their various components within the scope of the claims appended hereto.

In particular the fitting bearing 30 which the roller bearing cage 17 comprises according to the invention does not necessarily extend in a continuous circular fashion but may, alternatively, extend circularly discontinuously, the protuberance 53 of course being continuous. Likewise, a washer may be axially interposed between the turned over flange 18 and the flange 13. In this case the height of the flange 13 may be reduced so that it becomes a simple, possibly divided, ring.

As in FIG. 6 of French patent application No. 2544429, the washer 20 may comprise lugs which pass through the flange 13 by means of the channel which the latter is formed. In this case each lug comprises a return and the bearing surface is constituted by the part of the flange 13 or of the plate 47 facing these returns.

Finally in the case of a bistable washer, it is possible to adapt an arrangement with an outer rotatable race of the kind in FIG. 6, the groove 24 being made in the axial return.

What is claimed is:

1. A clutch release bearing suitable for an automobile vehicle, of the kind comprising an operating member and a drive member comprising a roller bearing having a non-rotatable race carrying a radial flange thereon, and a rotatable race between which are disposed rolling elements restrained by a roller bearing cage, said driving member bearing axially directly or indirectly against the operating member, and an elastic washer within the drive member adapted to clamp the drive member and the operating member axially together, said elastic washer bearing on a bearing surface of the operating member and on the radial flange connected to the non-rotatable race, said drive member comprising a fitting bearing operable to act on the elastic washer during relative approach of the drive member relative to the operating member during assembly, said fitting bearing being carried by the roller bearing cage and being axially disposed between the rotatable race and the radial flange of the non-rotatable race.

2. A clutch release bearing according to claim 1, wherein said fitting bearing is formed at least in part by a radial projection integral with said cage.

3. A clutch release bearing according to claim 2, wherein an edge of the radial projection facing the bearing surface of the operating member is bevelled.

4. A clutch release bearing according to claim 1, wherein said fitting bearing consists of a shoulder provided on said cage.

5. A clutch release bearing according to claim 1, wherein narrow passages are formed between the cage and said radial flange and between the cage and said rotatable race.

* * * * *